United States Patent Office 2,905,566
Patented Sept. 22, 1959

2,905,566

PLASTER COMPOSITION

Bertil John Martin Schmidt, Pershagen, and Karl Gustav Olsson, Solna, Sweden, assignors, by mesne assignments, to Casius Corporation Limited, Montreal, Quebec, Canada No Drawing. Application April 4, 1956
Serial No. 575,955

9 Claims. (Cl. 106—170)

This invention relates to a plaster and spackle composition for building purposes.

As is well known, the walls and ceilings in buildings must often be subjected to a preliminary treatment before the final surface treatment, such as painting or wallpapering, is carried out. For this purpose, a plaster composition is nowadays frequently employed which may even replace the conventional plastering with lime mortar or lime-cement mortar on brickwork and concrete walls.

A plaster composition of this type usually consists of a water soluble organic binding agent, such as a water soluble cellulose derivative, or an emulsion of a water insoluble binding agent, such as an emulsion of a plastic and inorganic fillers of various grain sizes, together with water in a quantity sufficient to impart to the mass a paste-like or plastic consistency. If desired, the plaster composition may also contain coloring substances, hydraulic binding agents and fibers of some kind.

The demands made of such a plaster are that it must be flexible and easily worked, that it must adhere rigidly to the base, and that it must dry without appreciable shrinkage, crack formation or "sinking," and that it must provide a durable and suitable base for the subsequent treatment.

In this connection it has been found that the grain gradation of the inorganic fillers is of decisive importance. These fillers usually consist of a coarser grained part, such as graded sand, ground feldspar, dolomite or the like, and also of an appreciable quantity of a very fine-grained material, such as suspended chalk or infusorial earth. This fine-grained material exercises a decisive effect on the plasticity of the plaster and in this connection, the shape, porosity, hardness, moisture absorption and chemical properties of the grains are of importance.

According to the present invention, it has now been found that calcium hydrosilicate produced by a hydrothermal treatment of a mixture of a finely divided silica-containing material and a lime-containing material and obtained in a fine crystalline form with a grain size essentially less than 0.1 mm., possesses excellent properties as a fine-grained filler in a plaster of this kind.

Based on this discovery, the present invention relates to a plaster of the said kind which is mainly characterized by the fact that the fine-grained fraction of the filler (with a grain size less than 0.1 mm.) consists entirely or substantially of a hydrothermally produced crystalline calcium hydrosilicate having a grain size substantially within the range 0.01–0.001 mm.

The plaster and spackle composition according to the invention consists chiefly of inorganic fillers of varying grain sizes including a coarse-grained fraction of graded sand, ground feldspar, dolomite and the like and a fine-grained fraction with a grain size below 0.1 mm., consisting entirely of calcium hydrosilicate of the kind defined above or containing at least 15–20% thereof. In addition, said fine-grained fraction may also contain other fine-grained materials such as suspended chalk or infusorial earth. The proportions of the coarse-grained fraction may be 25–65 parts by weight and the proportions of the fine grained fraction 70–30 parts by weight. Further, the composition should contain a suitable organic binder in an amount from 1/10 to 5%, based on the dry content of the composition, and water in a quantity sufficient to give the composition a pasty or plastic consistency.

The grain sizes and proportions of the inorganic filler may be as follows:

| | Percent |
|---|---|
| Grain sizes larger than 0.3 mm. | 5–15 |
| Grains, 0.15–0.3 mm. | 35–50 |
| Grains, 0.1–0.15 mm. | 15–25 |
| Grains, 0.1–0.01 mm. | 15–30 |
| Grains smaller than 0.01 mm. | 20–40 |

For the production of the calcium hydrosilicate various fine-grained substances containing accessible silica, such as infusorial earth, quartz flour or the like may be used as the silicious raw material. As the calcareous raw material, lime, slaked or unslaked, or reactive lime containing mixtures or substances, such as cement, blast-furnace slag or the like may be used. The two starting materials are finely divided and carefully mixed and are then subjected in a suitable apparatus, such as an autoclave, to the action of water or steam. To enable the reaction to take place relatively quickly saturated steam and temperatures exceeding 140° are preferably employed.

More particularly, for the production of the hydrothermal calcium silicate finely ground silica-containing material is mixed with lime in the proportions of 100 parts of $SiO_2$ to 80–95 parts of unslaked lime, or 100–120 parts of slaked lime, and 200–300 parts of water, and this mixture is then heated in an autoclave, as indicated below.

The silica-containing material used is ground down to such a grain size that 80% thereof passes a 60 mesh screen, and 25% of this fraction passes a 200 mesh screen. If unslaked lime is used, it is crushed to small pieces. Since the lime will be slaked during the treatment it is preferable to use unslaked lime, if such is available. It is also possible to use slaked lime obtained as a waste material from other processes such as the production of acetylene from carbide.

The mixture of silica, lime and water is then heated in an autoclave provided with stirring means. After the raw materials have been introduced, the autoclave is closed, stirring is started and steam under pressure is admitted. The heating is effected to a temperature of 140–200° C., preferably 160–185° C. under the corresponding pressure of saturated steam. The duration of the heating differs with the temperature and the material used but should be at least 4 hours. When the reaction is completed, the steam supply is cut off completely and the contents are immediately drawn off through the bottom valve of the autoclave into a chamber in which the water is converted to steam by the sudden drop of pressure, the steam being separated out. Any lumps formed are hereby broken up and the calcium hydrosilicate is obtained in the form of a dry, fine powder with a grain size of 0.01–0.001 mm.

As silica-containing material in the hydrothermal reaction it is particularly advantageous to use a quartz-containing sand of such gradation and in such a quantity that, after the reaction, a mixture of calcium hydrosilicate and sand is obtained which is suitable for direct addition as a filler in the plaster composition.

For example, the starting material may be a sand of the following gradation:

| | Percent |
|---|---|
| Grain sizes larger than 0.3 mm. | 5–15 |
| Grains, 0.15–0.3 mm. | 40–50 |
| Grains, 0.1–0.15 mm. | 25–35 |
| Grain sizes less than 0.1 mm. | 20–50 |

The content of the quartz or other reactive forms of $SiO_2$, such as flint, agate or the like, should be at least 40%. 100 parts of this sand are mixed with 10–20 parts unslaked lime and steam hardened, as described previously. The mixture of sand and calcium hydrosilicate obtained will contain about 80 parts sand and about 25 parts calcium hydrosilicate with the following distribution amongst the different grain sizes:

| | Percent |
|---|---|
| Grain sizes larger than 0.3 mm. | 5–15 |
| Grains, 0.15–0.3 mm. | 35–50 |
| Grains, 0.1–0.15 mm. | 15–25 |
| Grains, 0.1–0.01 mm. | 15–30 |
| Grains smaller than 0.01 mm. | 20–40 |

It is also possible to use finely ground light weight concrete as a filler, if it has been produced from suitable raw materials and by a method resulting in the formation of calcium hydrosilicate, as indicated above. A certain amount of waste always arises in handling the finished product, owing to the damaging of blocks or the like. According to the invention this waste can now be utilized and employed for the production of the spackle. If desired, it may be mixed with more sand or with calcium hydrosilicate produced in the manner previously described.

For example, it is particularly suitable to employ waste of light weight concrete of the kind produced according to the method described in U.S. Patent No. 2,081,802, issued on May 22, 1946. As will be seen from the example on page 1, column 2, line 53 and the following lines, such concrete is prepared, for example, from 25 parts cement, 25 parts very finely ground sand and 50 parts coarser sand with a maximum grain size of 0.5 mm. Water is added thereto and the mixture is rendered porous with aluminum powder or in some other manner. The mixture is then cast in molds and steam hardened. In the concrete so produced the sand grains are cemented together by calcium hydrosilicate crystals having a grain size of about 0.001 mm.

The waste is first crushed and then ground. Grinding is preferably so adjusted that the greater part of the calcium hydrosilicate crystals are loosened from the sand grains, whereby a powder mixture is obtained consisting of fine sand particles and calcium hydrosilicate crystals. After having determined the grain size distribution for the other material, sand in a suitable quantity and gradation is added so that the total sifting curve of the mixture will be in accordance with what has been stated above.

As examples of suitable binders may be mentioned water soluble cellulose derivatives, such as methyl cellulose and ethyl cellulose. Other examples are commercial emulsions of plastics, such as polyvinylchloride, polyvinylethers, polyvinylacetate, polyvinylbutyrates, polyvinylvinylidene, acrylate esters, polystyrol, polymerisates of asymmetric dichloroethylene, emulsions of natural and synthetic rubber, such as neoprene, isobutylene, styrene-butadiene and others. As common requirements it may be mentioned that the plastic film formed by the emulsions must not be too brittle, on which account some plastifying agents, for example tricresylphosphate, may be added to some of the polymerisates indicated above. The tensile strength should be at least 10 kg./cm.$^2$. The emulsions mentioned are all available on the market in concentrations of between 40 and 60%. Powders of polystyrol are obtainable commercially which can be emulsified in water together with a plastifier, whereby a suitable emulsion is obtained.

To facilitate the mixing of the ingredients of the composition it may in some cases be suitable to add a small quantity, maximum 1% based on the dry components of the mixture of a wetting agent. As suitable agents of this kind alkali salts and polyacryl esters, such as low polymer ammonium polyacrylate, polyglycols and polyglycol derivatives, etc. may be mentioned. The wetting agent should be of the non-foam forming type.

It has been found that calcium hydrosilicate as a filler possesses great advantages over chalk and other fine-grained fillers. It yields a flexible, elastic and easily worked plaster which does not dry too rapidly even when placed on a base exerting a strong suction effect. In this way shrinkage and sinking of the layer of plaster or spackle are prevented while at the same time it adheres excellently to the base and obtains satisfactory strength.

The best results are obtained when calcium hydrosilicate is used exclusively as the fine-grained filler in the plaster composition. On economical and practical grounds, however, it is often necessary or preferable to allow the fine-grained filler to consist partly of other materials, for example, the fine fraction of sand which must otherwise be sifted out, or chalk or infusorial earth. However, as indicated above, at least 15–20% of the fine-grained fraction should consist of calcium hydrosilicate in order to obtain the desired effect.

*Example 1*

| | Parts by weight |
|---|---|
| Calcium hydrosilicate | 20 |
| Graded sand | 80 |
| Binder (aqueous emulsion of a plastic) | 2 |
| Water | 30 |

The various grain sizes and proportions of the graded sand may be as follows, for example

| | Percent by weight |
|---|---|
| Grains larger than 0.3 mm. | 5–15 |
| Grains of 0.15–0.3 mm. | 40–50 |
| Grains of 0.1–0.15 mm. | 15–25 |
| Grains less than 0.1 mm. | 20–40 |

The calcium hydrosilicate is produced by reacting a water suspension containing equal parts of quartz flour and slaked lime in an autoclave for 5 hours at 180°, as indicated above. The suspension of calcium hydrosilicate so obtained having a grain size below 0.01 mm. is then dehydrated to a suitable water content and is mixed with the other ingredients.

*Example 2*

100 parts sand, graded as indicated above and containing at least 20% quartz, is suspended in water with 20 parts cement and treated in an autoclave for 10 hours at 160°. The suspension of sand and calcium hydrosilicate so obtained is then dehydrated to a suitable water content, and is mixed with 5% of asbestos fibers and 3% of an aqueous emulsion of a plastic, based on the dry weight of the sand and calcium hydrosilicate.

*Example 3*

60 parts of light-weight concrete waste containing 30% calcium hydrosilicate is ground until 60% thereof passes through a sieve with a free mesh width of 0.1 mm.; it is then mixed with 20 parts of graded sand and 2 parts of water-soluble cellulose glue and water to a suitable consistency.

*Example 4*

| | Parts by weight |
|---|---|
| Calcium hydrosilicate | 50 |
| Sand, 1–0.1 mm. | 20 |
| Methyl cellulose | 0.5 |
| Water-soluble powder of a plastic | 2 |
| Wetting agent | 0.1 |

The above-mentioned examples of the fineness of the calcium hydrosilicate is substantially within the range 0.01–0.001 mm. Further, it is understood that in the above-mentioned examples the proportions of the components may be varied within wide limits depending upon the raw materials actually employed.

What we claim is:

1. A plastic and spackle composition adapted to be mixed with water to form a mass of pasty and plastic consistency suitable for plastering walls and ceilings consisting essentially of a coarse grained fraction of inorganic fillers in an amount within the range 25-65 parts by weight, a fine grained fraction of inorganic fillers having a grain size below 0.1 mm. in an amount within the range 30-70 parts by weight, an organic binder consisting of water soluble cellulose derivatives in an amount of 1/10 to 5% by weight based on the filler, said fine grained fraction of filler containing at least 15% of a crystalline calcium hydrosilicate produced by a hydrothermal reaction and having a grain size substantially within the range 0.01-0.001 mm.

2. A plaster and spackle composition adapted to be mixed with water to form a mass of pasty and plastic consistency suitable for plastering walls and ceilings consisting essentially of a coarse grained fraction of inorganic fillers in an amount within the range 30-70 parts by weight, an organic binder consisting of aqueous emulsions of organic thermoplastic resins in an amount of 1/10 to 5% by weight based on the filler, said fine grained fraction of filler containing at least 15% of a crystalline calcium hydrosilicate produced by a hydrothermal reaction and having a grain size substantially within the range 0.01-0.001 mm.

3. A plaster and spackle composition adapted to be mixed with water to form a mass of pasty and plastic consistency suitable for plastering walls and ceilings consisting essentially of a coarse grained fraction of inorganic fillers, a fine grained fraction of inorganic fillers having a grain size below 0.1 mm., an organic binder consisting of water soluble cellulose derivatives in an amount of 1/10 to 5% by weight based on the filler.

4. A plaster and spackle composition adapted to be mixed with water to form a mass of pasty and plastic consistency suitable for plastering walls and ceilings consisting essentially of a coarse grained fraction of inorganic fillers, a fine grained fraction of inorganic fillers having a grain size of below 0.1 mm., an organic binder consisting of aqueous emulsions of organic thermoplastic resin in an amount of 1/10 to 5% by weight based on the filler.

5. A plaster and spackle composition adapted to be mixed with water to form a mass of pasty and plastic consistency suitable for plastering walls and ceilings consisting essentially of a coarse grained fraction of inorganic fillers in an amount within the range 25-65 parts by weight, a fine grained fraction of inorganic fillers having a grain size below 0.1 mm., in an amount within the range 30-70 parts by weight, and an organic binding agent in the form of an emulsion of organic thermoplastic resins in an amount of 1/10 to 5%, based on the inorganic fillers, said fine grained fraction of filler containing at least 15% by weight of a crystalline calcium hydrosilicate, and said calcium hydrosilicate crystals having a grain size substantially within the range 0.01-0.001 mm.

6. A plaster and spackle composition adapted to be mixed with water to form a mass of pasty and plastic consistency suitable for plastering walls and ceilings consisting essentially of a coarse grained fraction of inorganic fillers in an amount within the range 25-65 parts by weight of which 5-15% is larger than 0.3 mm., 35-50% is 0.15-0.3 mm. and 15-25% is 0.1-0.15 mm., a fine grained fraction of inorganic fillers having a grain size below 0.1 mm., in an amount within the range 30-70 parts by weight, and an organic binding agent in the form of an emulsion of organic thermoplastic resins in an amount of 1/10 to 5%, based on the inorganic fillers, said fine grained fraction of filler containing at least 15% by weight of a crystalline calcium hydrosilicate produced by a hydrothermal reaction and having a grain size substantially within the range 0.01-0.001 mm.

7. A plaster and spackle composition adapted to be mixed with water to form a mass of pasty and plastic consistency, suitable for plastering walls and ceilings, consisting essentially of a coarse grained fraction of graded sand in an amount of 25-65 parts by weight of which 5-15% is larger than 0.3 mm., 35-50% is 0.15-0.3 mm., and 15-25% is 0.1-0.15 mm., a fine grained fraction of inorganic fillers having a grain size below 0.1 mm., in an amount within the range 30-70 parts by weight, and a small amount of an organic binding agent in the form of an emulsion of thermoplastic resins in an amount of 1/10 to 5%, based on the inorganic fillers, said fine grained fraction of filler containing at least 15% of a crystalline calcium hydrosilicate produced by a hydrothermal reaction between finely divided silica containing material and lime in proportions of 100 parts of $SiO_2$ to 85-95 parts of unslaked lime admixed with 200-300 parts of water under saturated steam pressure at a temperature of 140-200° C. for at least 4 hours, said calcium hydrosilicate crystals having a grain size substantially within the range 0.01-0.001 mm.

8. The paster and spackle composition of claim 7 wherein the calcium hydrosilicate is produced by a reaction within the range of 160-185° C.

9. The plaster and spackle composition of claim 7 wherein the two filler fractions including the calcium hydrosilicate are produced by reacting a mixture of graded sand having a silica content of at least 40% and containing 20-50% by weight of grains smaller than 0.1 mm. with unslaked lime in the proportions of about 100 parts of sand to 10-20 parts of lime and a temperature within the range 160-185° C., 20-40% of said calcium hydrosilicate crystals formed in the reaction having a grain size below .01 mm.

References Cited in the file of this patent

UNITED STATES PATENTS

| | | |
|---|---|---|
| 1,327,145 | Charlton | Jan. 6, 1920 |
| 1,992,488 | Jones | Feb. 26, 1935 |
| 2,215,891 | Thomson et al. | Sept. 24, 1940 |
| 2,243,369 | Albert | May 27, 1941 |
| 2,665,996 | Kalousek | Jan. 12, 1954 |
| 2,698,251 | Shea | Dec. 28, 1954 |
| 2,698,807 | Assaf | Jan. 4, 1955 |
| 2,751,308 | Arrighini | June 19, 1956 |